Aug. 17, 1926.
E. S. DAY
1,596,813
HAY BUNCHER
Filed Oct. 11, 1924
4 Sheets-Sheet 1
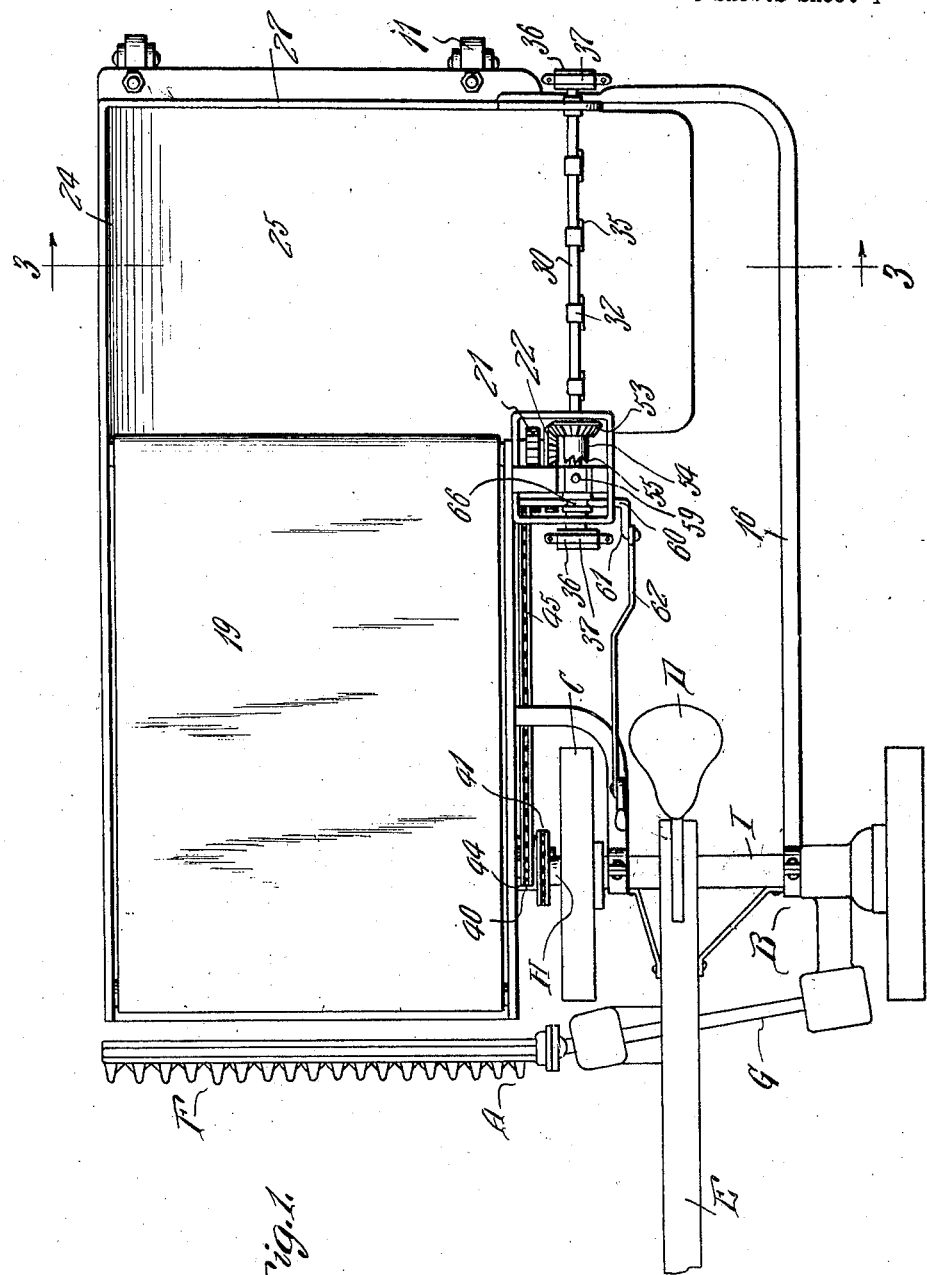
E. S. Day
INVENTOR
BY Victor J. Evans
ATTORNEY

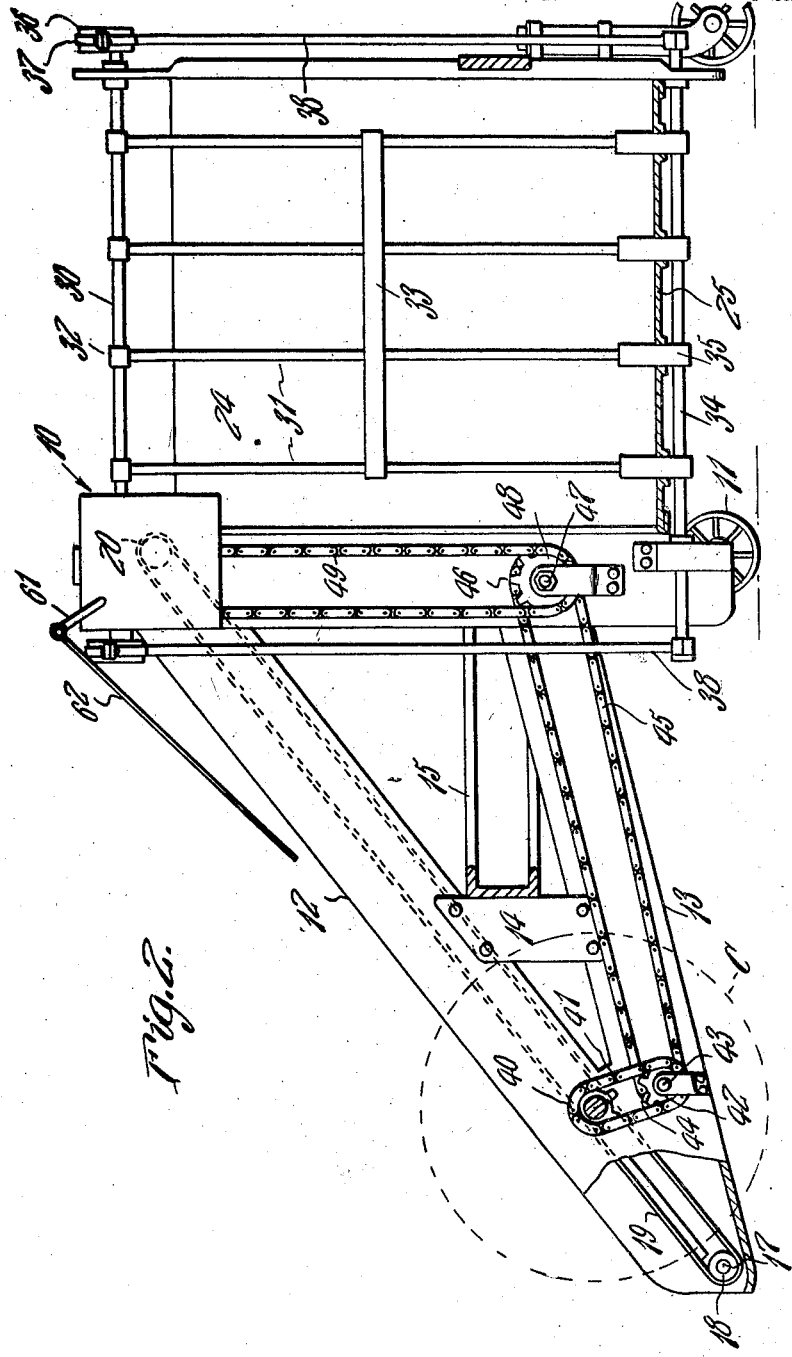

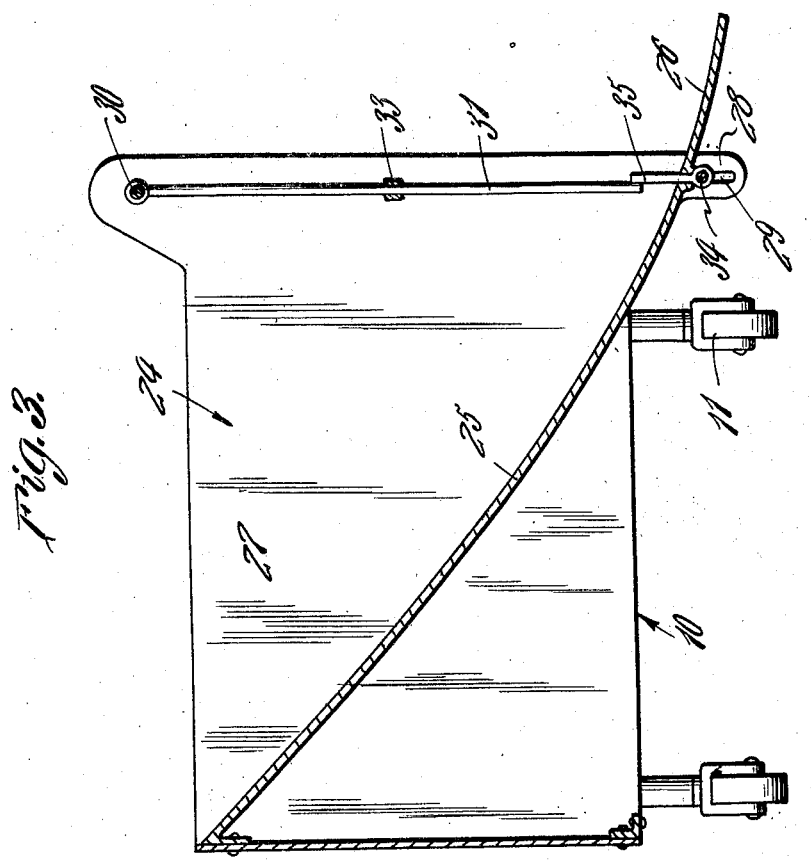

Aug. 17, 1926.
E. S. DAY
HAY BUNCHER
Filed Oct. 11, 1924
1,596,813
4 Sheets-Sheet 4
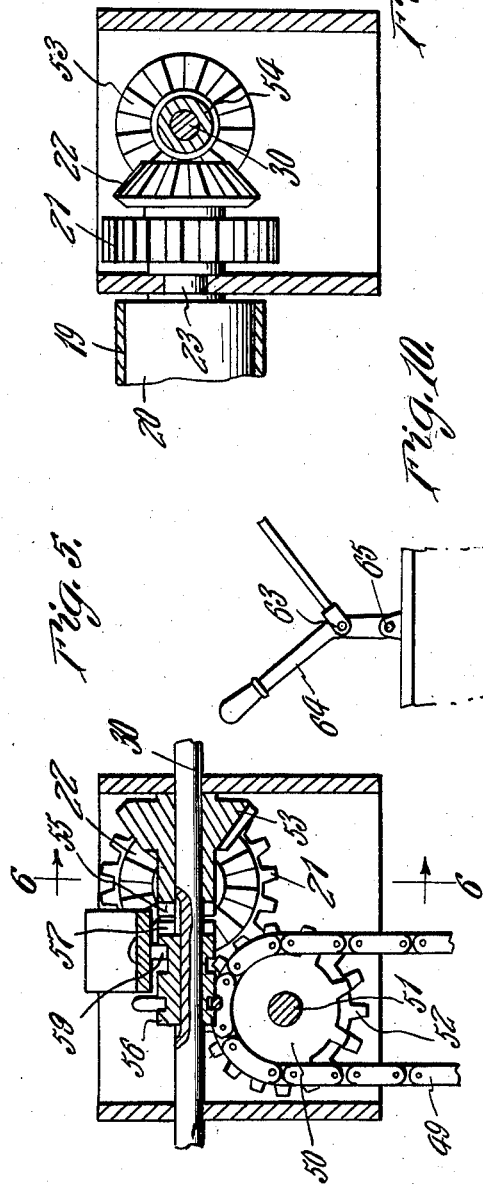
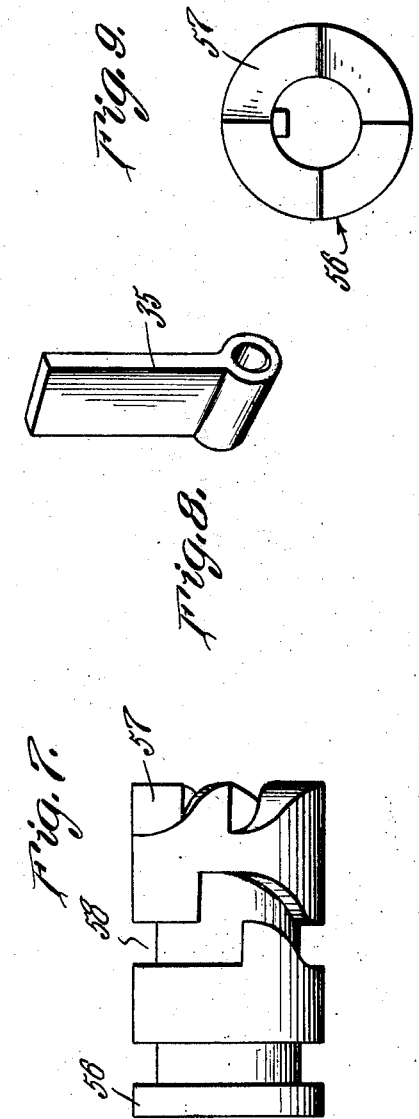
E. S. Day
INVENTOR
BY Victor J. Evans
ATTORNEY Patented Aug. 17, 1926.

1,596,813

UNITED STATES PATENT OFFICE.

EDWIN S. DAY, OF CASTLE DALE, UTAH.

HAY BUNCHER.

Application filed October 11, 1924. Serial No. 743,008.

This invention relates to harvesting apparatus, particularly to hay bunchers, and has for its object the provision of a novel device which is adapted to be associated with an ordinary mowing machine for the purpose of receiving the hay as it is cut and causing it to collect within a hopper to define a bunch which may be discharged onto the ground at the will of the operator.

It is well known that when hay is cut by an ordinary mowing machine, the hay falls upon the ground and is trampled upon by the team and also by the mowing machine itself when driving about the field.

It becomes necessary naturally to use a horse rake for the purpose of raking the hay into windrows, which are subsequently formed into bunches located at spaced intervals throughout the field. These operations of course require the services of two or more operators and the work is more or less expensive in addition to the other disadvantages caused by the scarcity of labor.

Another point is that many farmers use very coarse fertilizer of different kinds and the larger pieces of such matter will remain upon the field and are raked up along with the hay naturally causing great annoyance throughout the period that the hay is used for feeding purposes.

It is with the above facts in view that I have designed the present device which is adapted to be attached to a mowing machine and which will gather up the hay after it is cut and prevent it from falling upon the ground at all until it is formed into a bunch, which may be deposited at any place desired, the device consequently avoiding any necessity for raking the field and thus saving the cost of labor as well as time.

An important object is the provision of a device of this character which is provided with manually controllable means for permitting the discharge of the completed bunch at any desired time, automatic means being provided for restoring the dumping means to initial position without further attention.

The invention further contemplates the general improvement of devices of this character in point of construction and arrangement whereby the efficiency will be greatly improved.

An additional object is the provision of a hay buncher which will be comparatively simple and inexpensive in manufacture, easy to install, positive in action, durable in service, and a general improvement in the art.

With the above and other objects and advantages in view, the invention consists in the details of construction to be hereinafter more fully described and claimed, and illustrated in the accompanying drawings, in which:—

Figure 1 is a plan view of the device showing it associated with a mowing machine.

Figure 2 is a side elevation with the forward supporting frame bar shown in section.

Figure 3 is a cross section on the line 3—3 of Figure 1.

Figure 4 is a detail sectional view showing the means for operating or releasing the holding means for the gate.

Figure 5 is a detail sectional view showing the transmission mechanism at the top of the device.

Figure 6 is a section on the line 6—6 of Figure 5.

Figure 7 is a detail view of the cam.

Figure 8 is a detail perspective view of one of the gate holding members.

Figure 9 is an end elevation of the cam and

Figure 10 is a detail view of the control handle or lever.

Referring more particularly to the drawings, the letter A designates, broadly, a mowing machine of any ordinary or preferred type which is here represented as including a frame B mounted upon ground engaging wheels C and carrying a seat D for the operator. Connected with the frame is a suitable draft tongue E or the like whereby the device may be pulled along the ground. This machine further includes the usual cutter bar mechanism designated broadly at F and of any ordinary construction. The operating mechanism for this cutting mechanism is of the usual variety and may include a pitman G driven in any desired manner. The letter H designates the rotatable axle from which power is taken.

In carrying out my invention I provide a supporting frame structure designated broadly by the numeral 10 which frame may be of any desired specific construction depending upon the taste of the manufacturer. This frame is designed to be connected with the mowing machine so as to trail behind it and the frame is supported by a plurality of ground engaging caster or other wheels indicated at 11. The frame 10 includes forwardly extending portions 12 and 13 connected by a brace 14. The frame further includes a bar member 15 which is secured to this brace 14 at the rear thereof and which extends around the rear of the frame 10. It will be observed that this entire frame structure is connected with the mower by means of one or more bars 16 clamped upon the housing I of the mowing machine within which the axle H is located. Obviously any other manner of connecting the frame 10 with the mowing machine may be resorted to within the spirit of the invention, no restriction in this respect being desired.

The forward members 12 of the main frame constitute the sides of a conveyor structure and journaled between the forward ends of these members 12 is a shaft 17 carrying a roller 18 about which is trained an endless belt or apron 19 which extends upwardly and rearwardly in an inclined direction and which is further trained about a roller 20 journaled transversely of the upper portion of the frame 10. This roller 20 carries a spur gear 21 and a bevel gear 22 for a purpose to be described. Logically, the roller 20 and gears 21 and 22 are all mounted upon a shaft 23 suitably journaled in the frame. The conveyor defined by the apron or belt 19 has its forward end located immediately to the rear of the cutter bar F so that the hay cut by the latter will fall upon the conveyor and be carried upwardly thereby.

The rear portion of the main frame 10 is so constructed as to form a hopper 24 which has its bottom 25 inclined downwardly to one side and terminating beyond the frame to define an extension shown at 26 which is spaced slightly above the ground. The rear end of the frame is closed by a plate 27 and the lower outer corners of the hopper are formed with downward extensions 28 formed with slots 29 for a purpose to be described.

The hay received from the mower will pass upwardly or be carried upwardly by the apron 19 and will drop into the hopper 24 where it accumulates until a bunch has been formed. In order to hold the hay within the hopper and to prevent it from passing out until desired, I provide a shaft 30 journaled longitudinally of the machine or transversely of the upper portion of the hopper, which shaft serves as a support for a plurality of downwardly extending fingers 31 arranged in spaced parallel relation and defining a gate for the open end of the hopper. These fingers 31 have hub portions 32 freely rotatable upon the shaft 30 and they are connected by a cross bar 33 which holds them associated in the proper relation so that they all may be moved in unison by the means to be described.

The means for normally holding this gate formed by the fingers 31 in its normal or closed position consists of a shaft 34 which extends transversely of the rear portion of the hopper and which is located within the slots 29. By this means it is evident that the shaft 34 will be capable of vertical movement. Mounted upon this shaft and arranged in spaced relation corresponding to the spacing of the fingers 31 are upstanding lugs 35 which project upwardly beyond the lower ends of the fingers 31 so as to engage thereagainst and hold the gate against outward swinging movement.

Secured upon the ends of the shaft 30 are eccentrics 36 encircled by eccentric straps 37 carried by the upper ends of a pair of depending pitmans 38 which have their lower ends 39 pivotally engaged upon the ends of the shaft 34 as clearly shown in Figure 4. Obviously, by rotating the shaft 30 the eccentric 36 thereon will operate to move the pitman 38 longitudinally and raise and lower the shaft 39 so that the lugs 35 thereon may be brought into or out of obstructing relation with the lower ends of the fingers 31 forming the gate.

The transmission mechanism comprises a sprocket 40 mounted upon the axle H of the mowing machine so as to be rotated whenever the mowing machine is in operation. Trained about the sprocket 40 is a chain 41 which is also trained about a sprocket 42 mounted on a short shaft 43 suitably journaled in the forward positions 13 of the frame 10. The shaft 43 carries an additional sprocket 44 about which is trained a chain 45 which extends rearwardly and which is trained about a sprocket 46 on a shaft 47 suitably journaled at the forward portion of the main frame 10. The shaft 47 carries an additional sprocket 48 about which is trained a chain 49 which extends upwardly and which is trained about a sprocket 50 mounted on a shaft 51 which is journaled transversely of the upper portion of the frame 10. This shaft 51 also carries a spur gear 52 meshing with the above described spur gear 21 for driving the upper roller 20 of the endless belt or apron 19. The interposition of this gearing is necessary in order that the apron 19 will travel in the proper direction.

Rotatably mounted upon the forward end portion of the shaft 30 is a bevel gear 53 meshing constantly with the above described bevel gear 22 so as to be driven thereby at all times. The gear 53 is formed with an elongated hub member 54 having a clutch face 55. Splined upon the forward end portion of the shaft 30 is a clutch device including a grooved collar 56 having a clutch face thereon adapted to engage the clutch face 55 for the purpose of rotating the shaft 30 when it desired to do so and which will be explained. The grooved clutch member 56 is formed with a cam groove 58 into which extends a pin 59 depending from a portion of the frame 10 as clearly shown in Figure 5. The purpose of this pin is to cause the clutch member 56 to slide longitudinally after it makes one rotation.

The control means for this clutch mechanism comprises a rock shaft 60 suitably journaled in the frame and having a crank arm 61 with which is pivotally connected the rear end of a rod 62 which extends forwardly and which is pivotally connected at 63 with an operating lever 64 pivoted at 65 upon the frame in a position convenient to the driver occupying the seat D.

In the operation, it will be seen that when the mowing machine is drawn along the ground, the sprocket 40 driving the chain 41 will cause rotation of the sprocket 42 and shaft 43 and consequently the sprocket 44 which will drive the chain 45. The movement of this chain causes rotation of the sprockets 46 and 48 so that the chain 49 engaged about the latter will operate to drive the sprocket 50 and gear 52. The gear 52 meshing with the gear 21 will cause the roller 20 to be rotated and as this roller engages the upper end of the endless apron 19 it is apparent that the latter will be moved upwardly and rearwardly as long as the mower is in motion. Hay falling from the cutter bar will drop upon the forward end of the apron 19 and be carried thereby upwardly so that the hay will drop from the apron into the hopper 24 where it will accumulate until the gate formed by the rod 21 is positively opened by the operator. It will be observed that owing to the fact that the bevel gear 22 meshes with the bevel gear 53 the latter will be driven at all times but as it is rotatable upon the shaft 30 the latter will not move until the operator shifts the lever 64 to throw the clutch into operation.

Ordinarily, it will be observed that the shaft 34 is in its uppermost position so that the lugs 35 thereon will project above the lower ends of the fingers 31 and prevent them from swinging outwardly, this normal position being clearly shown in Figure 3 of the drawings.

When a sufficient quantity of hay has collected within the hopper 24 and the operator desires to discharge the bunch onto the ground, it is merely necessary that he grasp the lever 64 and swing it in the proper direction, whereupon the rod 62 connected with the crank 61 will rock the rock shaft 60, and as this shaft carries a fork 66 engaging within the grooved clutch member 56, it is evident that the clutch member 56 will be slid rearwardly so that the clutch face 57 thereon will engage the clutch face 55 on the hub 54 of the gear 53. When this is done, it is apparent that the shaft 30 will be rotated and the eccentric 36 on the ends thereof will cause movement of the eccentric straps 37 and pitman 38 so that the latter will move the shaft 34 downwardly and withdraw the lugs 35 from engagement with the lower ends of the fingers 31. There is nothing then to interfere with the outward swinging movement of the gate formed by these fingers and the weight of the hay resting upon the inclined bottom 25 of the hopper will cause this gate to swing outwardly so that the bunch of hay may slide off from the extension 26 and be deposited on the ground. Immediately the hay has passed through, the weight of the gate will cause it to return to its normal or depending position. After the clutch member 56 has been slid rearwardly as above described it is apparent that the engagement of the pin 59 within the cam groove 58 will cause the clutch member 56 to be slid forward automatically after it has made one complete revolution. By this means it is obvious that the clutching of the part is automatically disconnected so that by the time the gate has returned to its closed position the eccentric 36 of the shaft 30 will have moved the pitman 38 to such an extent that the shaft 34 carrying the lugs 35 will be returned to its normal or uppermost position so that the gate will again be held positively closed until the lever 64 is again operated by the driver.

From the foregoing description and a study of the drawings it will be apparent that I have thus provided a simply constructed, inexpensive and very easily operated and controlled hay bunching device which will entirely avoid any necessity for raking up cut hay and which therefore saves not only in time but in labor. Owing to the simplicity of the construction, and the comparative fewness of the parts it is evident that there is very little to get out of order so that the device should have a long life and satisfactorily perform all of its functions.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, what is claimed is:

1. In a device of the character described, a hopper, a pivoted gate normally closing the hopper, a vertically slidable horizontally disposed shaft, means on said shaft normally engaging the gate for preventing the latter from moving, and manually controllable power operated means for releasing said holding means, comprising gearing, an operative connection between said gearing and said shaft for moving the latter vertically, and a manually operated clutch device interposed in said gearing.

2. In a device of the character described, a hopper, a pivoted gate normally closing the hopper, a vertically slidable horizontally disposed shaft, means on said shaft normally engaging the gate for preventing the latter from moving, and manually controllable power operated means for releasing said holding means, comprising gearing, an operative connection between said gearing and said shaft for moving the latter vertically, a manually operated clutch device interposed in said gearing, and cam means associated with said clutch device for restoring the same to initial position subsequent to operation.

In testimony whereof I affix my signature.

EDWIN S. DAY.